(12) United States Patent
Duan

(10) Patent No.: US 7,643,184 B2
(45) Date of Patent: Jan. 5, 2010

(54) SCANNER HAVING A DRIVING DEVICE FOR STABLE DRIVING MOVEMENT OF AN IMAGE SENSOR CARRIAGE

(75) Inventor: Ping Duan, Dong-Guan (CN)

(73) Assignee: Aisa Optical Co., Inc., Taichung (TW)

( * ) Notice: Subject to any disclaimer, the term of this patent is extended or adjusted under 35 U.S.C. 154(b) by 1086 days.

(21) Appl. No.: 11/191,696

(22) Filed: Jul. 27, 2005

(65) Prior Publication Data

US 2006/0098252 A1 May 11, 2006

(30) Foreign Application Priority Data

Nov. 11, 2004 (TW) .............................. 93134431 A

(51) Int. Cl.
*H04N 1/04* (2006.01)
(52) U.S. Cl. ...................... 358/497; 358/474; 399/211; 399/212
(58) Field of Classification Search ................. 358/474, 358/471, 497, 505; 399/211, 212
See application file for complete search history.

(56) References Cited

U.S. PATENT DOCUMENTS 6,876,470 B2 *  4/2005  Ando ......................... 358/474
6,954,292 B2 * 10/2005  Inoue ......................... 358/475
7,126,728 B2 * 10/2006  Tseng et al. ................. 358/497

FOREIGN PATENT DOCUMENTS

JP          10243177 A   *   9/1998

* cited by examiner

*Primary Examiner*—King Y Poon
*Assistant Examiner*—Lennin R Rodriguez
(74) *Attorney, Agent, or Firm*—Townsend and Townsend and Crew, LLP

(57) ABSTRACT

A driving device for a scanner includes an elongate guiding unit mounted in a base and disposed under an image sensor carriage that extends in a first direction, extending along a second direction transverse to the first direction, and having first and second side rail surfaces transverse to a top rail surface. A roller unit is mounted rotatably on a bottom side of the image sensor carriage, and includes a first roller rotatable about a first axis parallel to the first direction and disposed to roll along the top rail surface, and a second roller rotatable about a second axis transverse to the first and second directions and disposed to roll along the first side rail surface. A spring-loaded retaining unit is mounted on the image sensor carriage, and is disposed to contact rotatablely the second side rail surface. A driving unit drives the image sensor carriage to move in the second direction in the base.

20 Claims, 11 Drawing Sheets

US 7,643,184 B2

SCANNER HAVING A DRIVING DEVICE FOR STABLE DRIVING MOVEMENT OF AN IMAGE SENSOR CARRIAGE

CROSS-REFERENCE TO RELATED APPLICATION

This application claims priority of Taiwanese Application No. 093134431, filed on Nov. 11, 2004.

BACKGROUND OF THE INVENTION

1. Field of the Invention

The invention relates to a driving device for a scanner, more particularly to a driving device that enables stable driving movement of an image sensor carriage in a scanner.

2. Description of the Related Art

Referring to FIGS. 1 to 3, a conventional scanner is shown to include a base 11, an elongate metal guide rod 12 disposed in the base 11 and extending in a first direction (A), an image sensor carriage 14 extending in a second direction (B) transverse to the first direction (A), movable along the guide rod 12, and having an image sensor 13 mounted thereon, a driving unit 15 for driving the image sensor carriage 14 to move along the guide rod 12 in the first direction (A), and a glass cover 16 to cover the base 11.

It is desirable to prevent wobbling of the image sensor carriage 14 relative to the guide rod 12 while the image sensor carriage 14 is driven by the driving unit 15 to move in the first direction (A), as shown in FIG. 2, so as to avoid deterioration of the scanning quality. Moreover, it is desirable to reduce the resistance to movement of the image sensor carriage 14 along the guide rod 12 for efficient power consumption.

SUMMARY OF THE INVENTION

Therefore, the object of the present invention is to provide a driving device for a scanner that enables stable driving movement of an image sensor carriage.

According to one aspect of the present invention, a scanner comprises:

a base;

an elongate image sensor carriage extending in a first direction; and a driving device including an elongate guiding unit mounted in the base, disposed under the image sensor carriage, and extending along a second direction transverse to the first direction, the guiding unit having at least one top rail surface, and first and second side rail surfaces transverse to the top rail surface, a roller unit mounted rotatably on a bottom side of the image sensor carriage, the roller unit including at least one first roller rotatable about a first axis parallel to the first direction and disposed to roll along the top rail surface, and at least one second roller rotatable about a second axis transverse to the first and second directions and disposed to roll along the first side rail surface, a spring-loaded retaining unit mounted on the bottom side of the image sensor carriage, and disposed to contact rotatablely the second side rail surface, and a driving unit for driving the image sensor carriage to move in the second direction in the base.

According to another aspect of the present invention, there is provided a driving device for a scanner that includes a base and an elongate image sensor carriage extending in a first direction in the base. The driving device comprises:

an elongate guiding unit adapted to be mounted in the base, adapted to be disposed under the image sensor carriage, and extending along a second direction transverse to the first direction, the guiding unit having at least one top rail surface, and first and second side rail surfaces transverse to the top rail surface;

a roller unit adapted to be mounted rotatably on a bottom side of the image sensor carriage, the roller unit including at least one first roller rotatable about a first axis parallel to the first direction and disposed to roll along the top rail surface, and at least one second roller rotatable about a second axis transverse to the first and second directions and disposed to roll along the first side rail surface;

a spring-loaded retaining unit adapted to be mounted on the bottom side of the image sensor carriage, and disposed to contact rotatablely the second side rail surface; and a driving unit adapted for driving the image sensor carriage to move in the second direction in the base.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
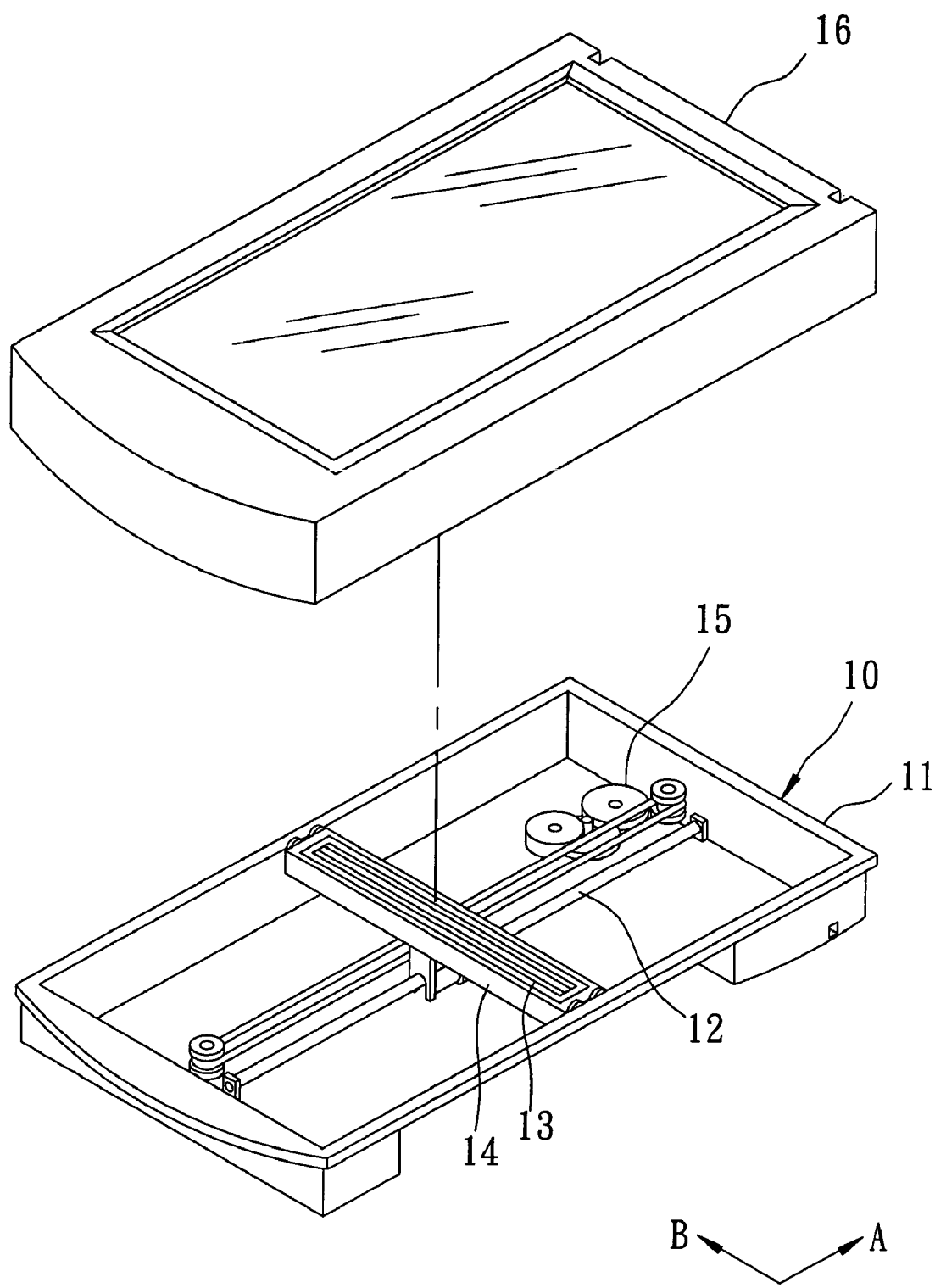
FIG. 1 is a partly exploded, perspective view of a conventional scanner.
Figure 2:
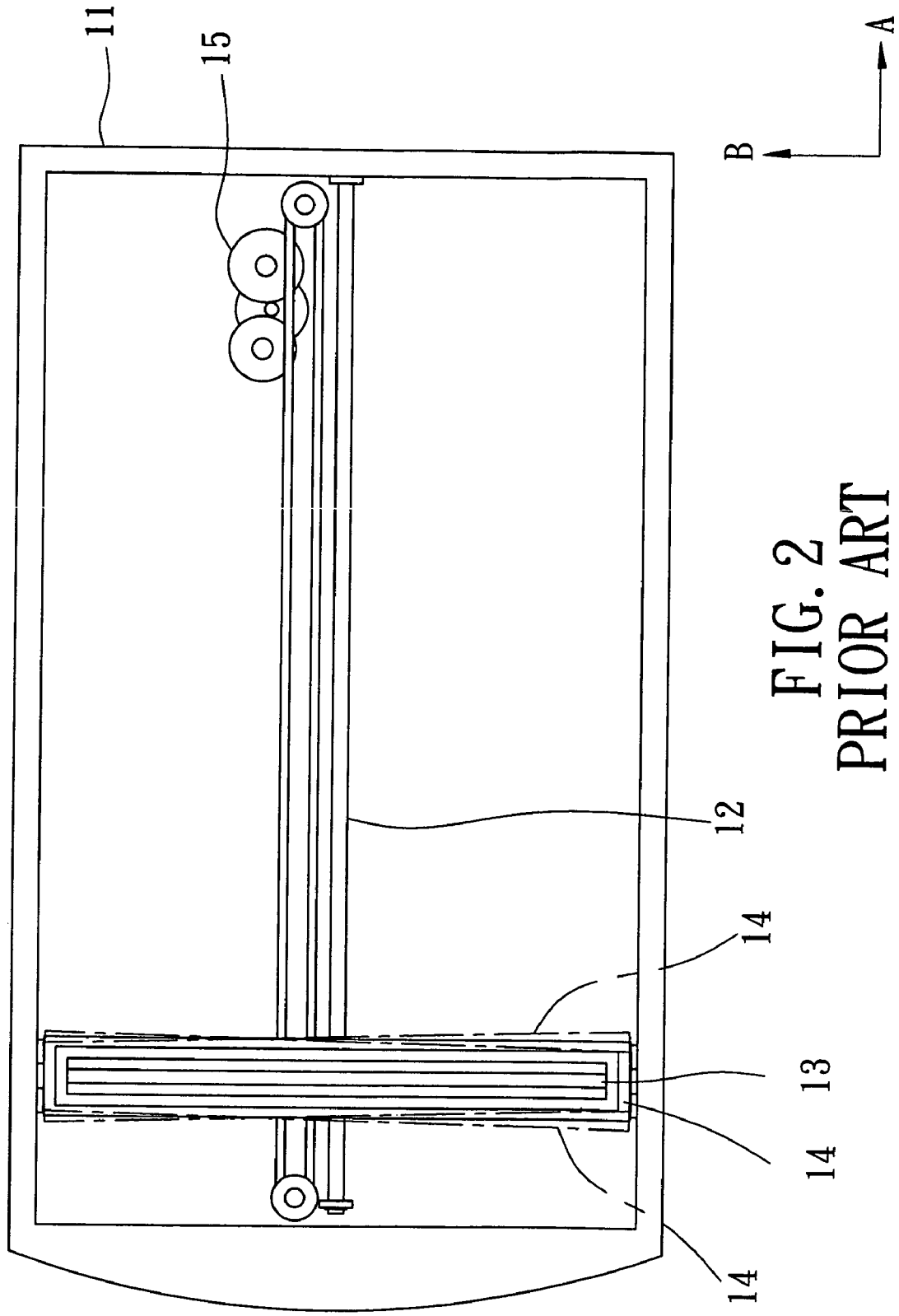
FIG. 2 is a schematic top view of a part of the conventional scanner.
Figure 3:
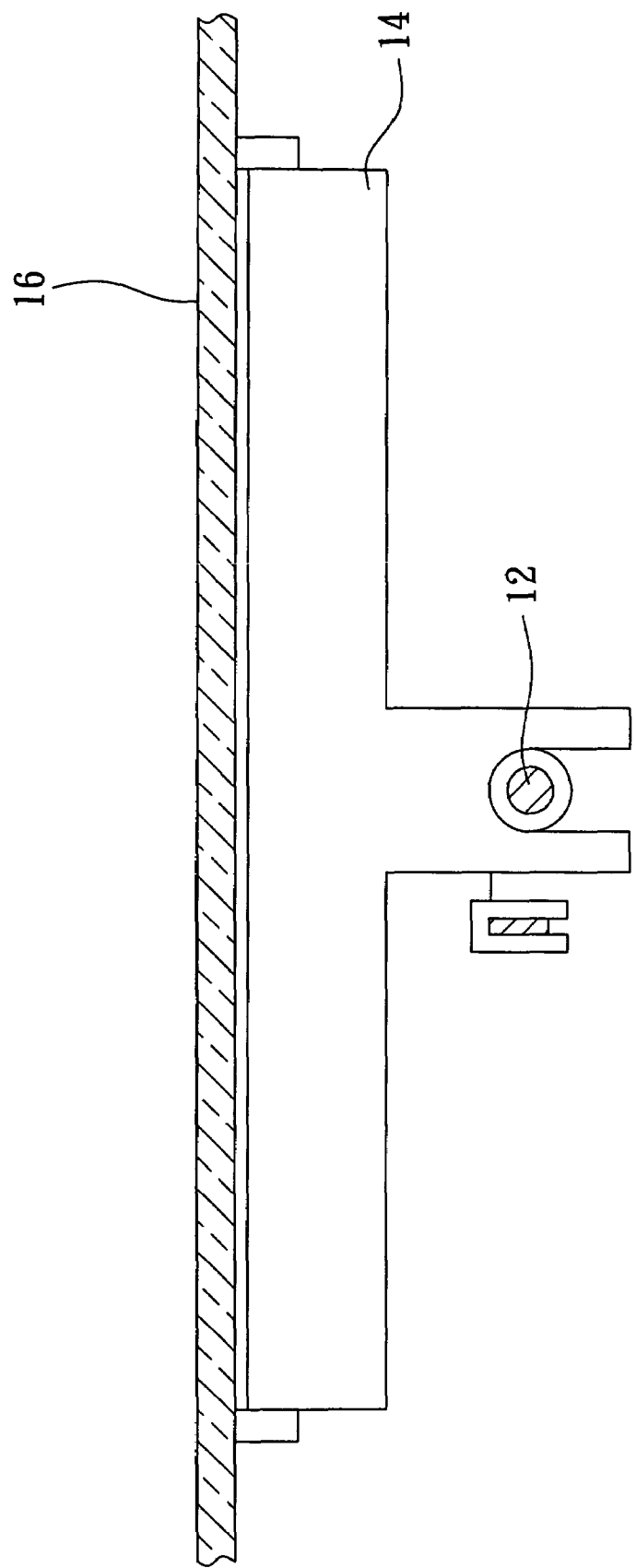
FIG. 3 is a fragmentary schematic sectional view showing a part of the assembled conventional scanner.

Before the present invention is described in greater detail, it should be noted that like elements are denoted by the same reference numerals throughout the disclosure.

Figure 4:
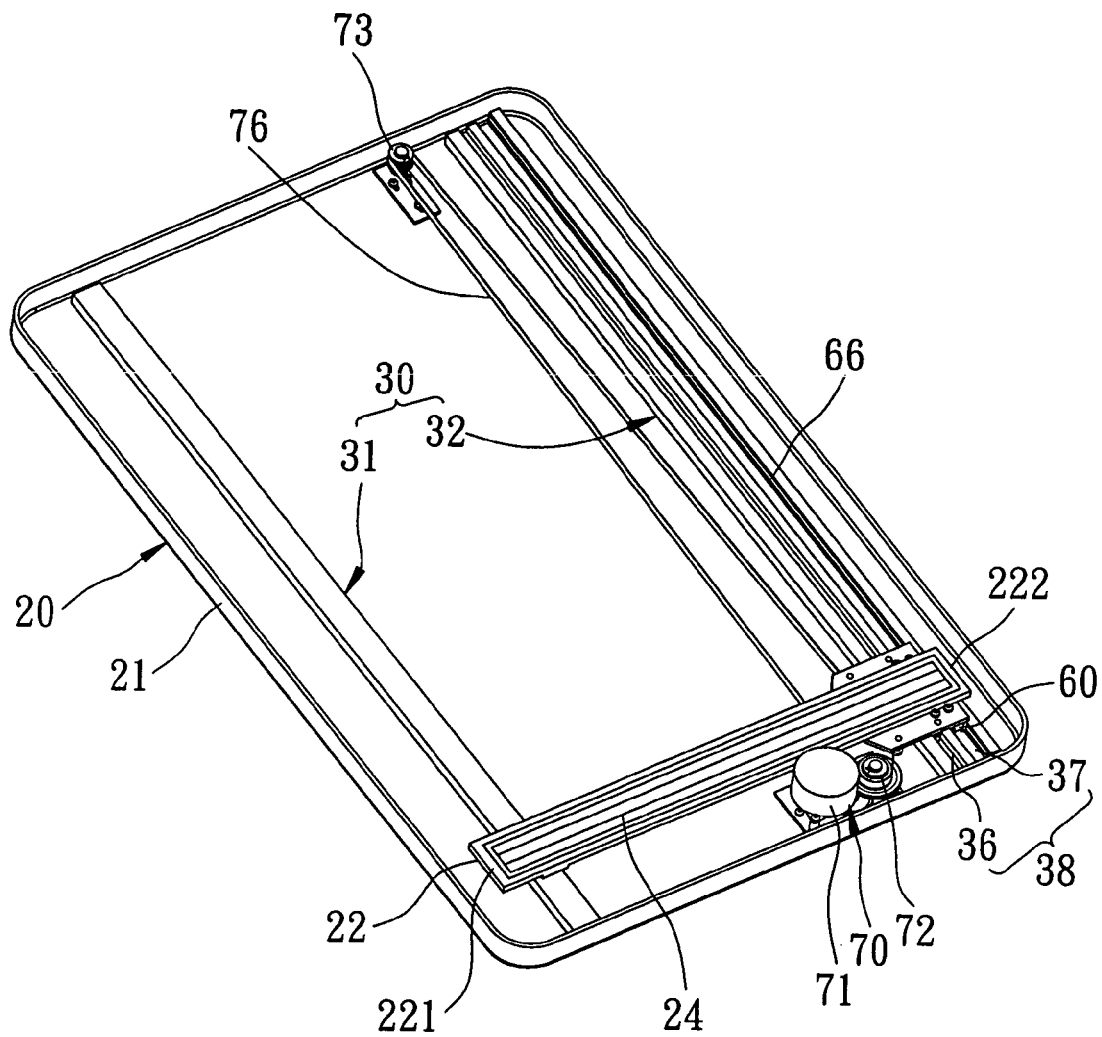
FIG. 4 is a perspective view showing the first preferred embodiment of a driving device installed in a scanner according to the present invention.
Figure 4:
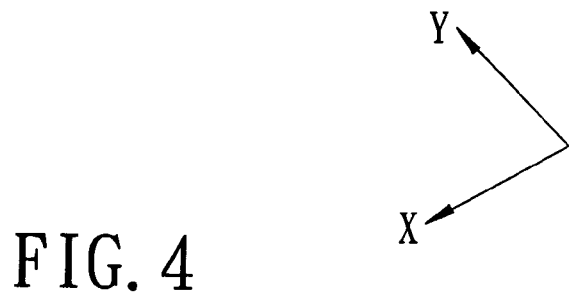
Figure 5:
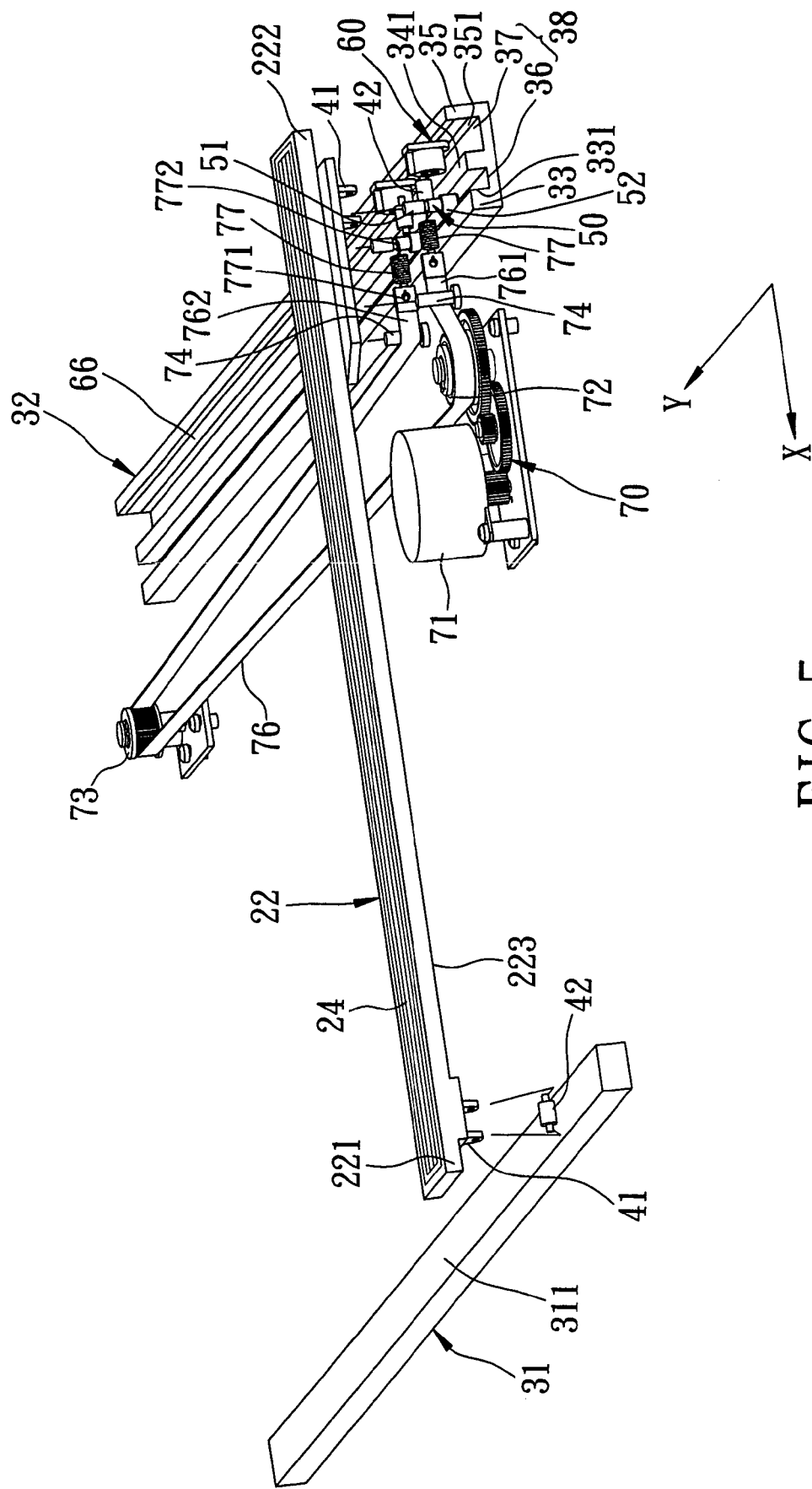
FIG. 5 is a partly exploded, perspective view showing the first preferred embodiment.
Figure 8:
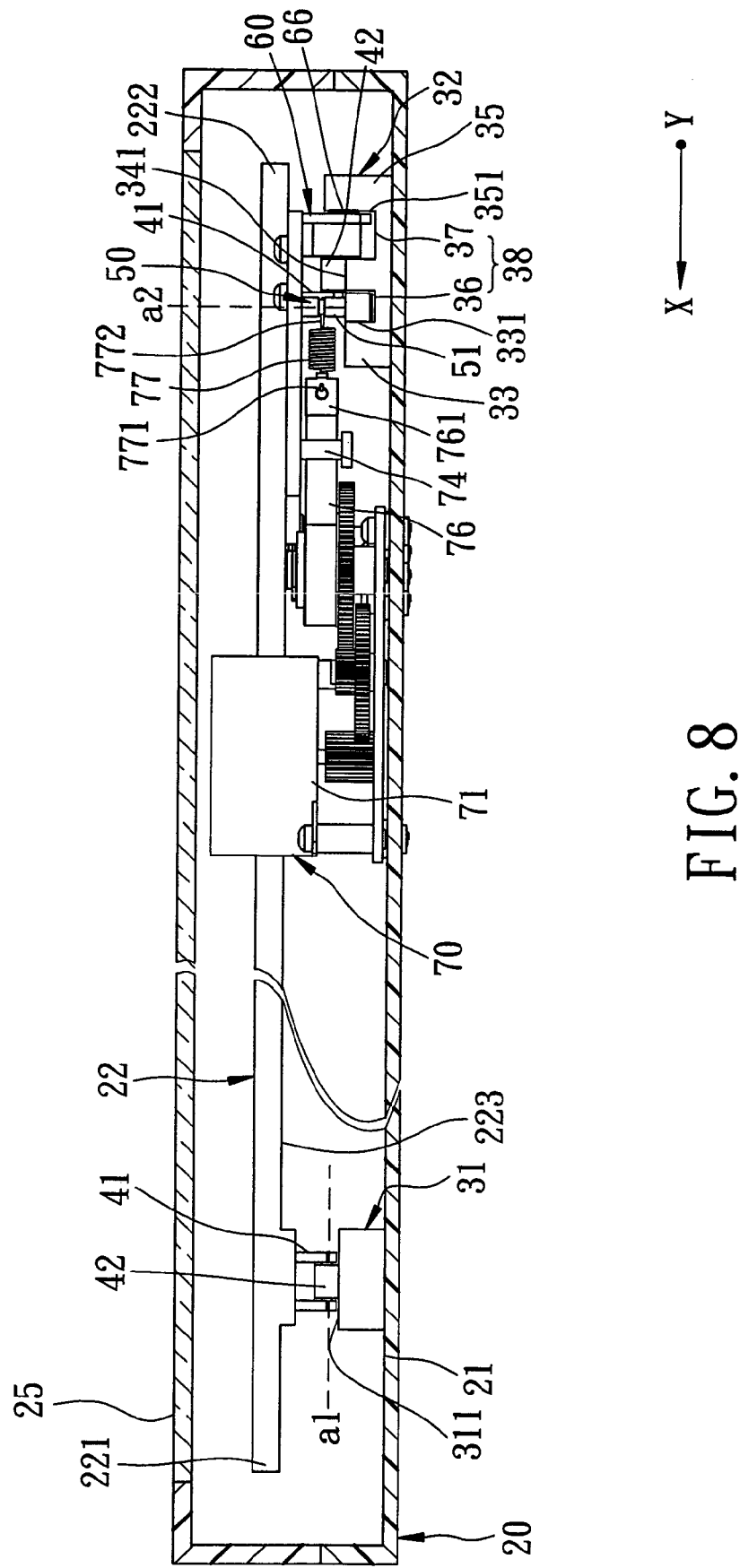
FIG. 8 is a fragmentary, partly sectional schematic view showing the scanner assembled with the first preferred embodiment.

Referring to FIGS. 4, 5 and 8, the first preferred embodiment of a driving device according to the present invention is shown to be adapted for use with a scanner 20. In this embodiment, the scanner 20 includes a base 21, an elongate image sensor carriage 22 disposed in the base 21 and having an image sensor 24 mounted thereon, and a glass cover 25 (see FIG. 8) for covering the base 21. The image sensor carriage 22 extends in a first direction (X), and has opposite end portions 221, 222, and a bottom side 223. The driving device includes an elongate guiding unit 30, a roller unit, a pair of spring-loaded retaining units 60, and a driving unit 70.

The guiding unit 30 is adapted to be mounted in the base 21, is adapted to be disposed under the image sensor carriage 22, and extends along a second direction (Y) transverse to the first direction (X). In this embodiment, the guiding unit 30 includes an elongate guiding seat 32 and an elongate rail rod 31.

The guiding seat 32 is adapted to be disposed adjacent to the end portion 222 of the image sensor carriage 22, and is formed with a guiding groove unit 38 that extends in the second direction (Y) and that includes first and second guiding grooves 36, 37. The guiding seat 32 further has a top rail surface 341 that is disposed between the first and second guiding grooves 36, 37. The first guiding groove 36 has a groove-confining wall 33 that includes a first side rail surface 331. The second guiding groove 37 has a groove-confining wall 35 that includes a second side rail surface 351. The first and second side rail surfaces 331, 351 are transverse to the top rail surface 311. Preferably, the second side rail surface 351 has a wear-resistant strip 66 attached thereto.

The rail rod 31 is adapted to be disposed adjacent to the end portion 221 of the image sensor carriage 22, and is parallel to and is spaced apart from the guiding seat 32. The rail rod 31 is formed with another top rail surface 311 transverse to the first and second side rail surfaces 331, 351.

The roller unit is adapted to be mounted rotatably on the bottom side 223 of the image sensor carriage 22. In this embodiment, the roller unit includes three first rollers 42 and two second rollers 50.

Figure 6:
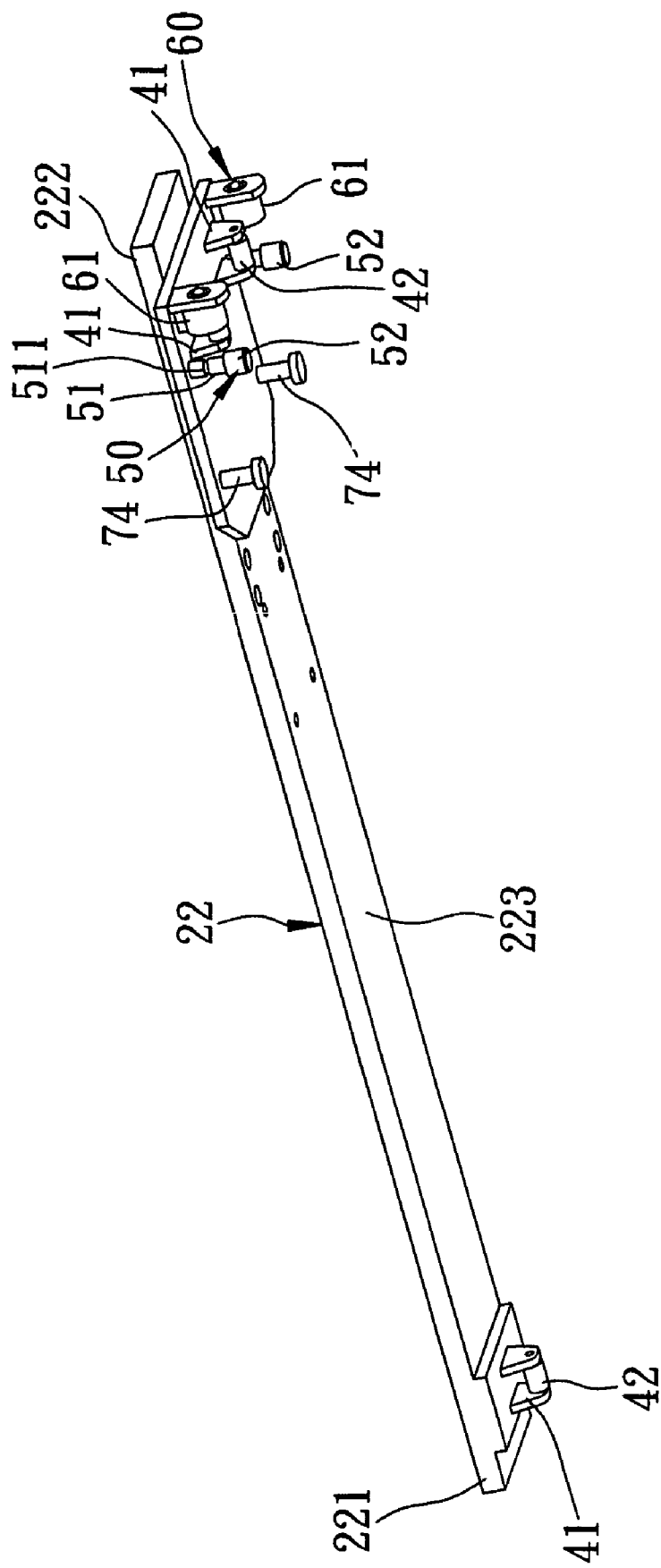
FIG. 6 is a perspective view showing an image sensor carriage mounted with a roller unit and a spring-loaded retaining unit of the first preferred embodiment.

The first rollers 42 are adapted to be mounted rotatably and respectively on three roller-mounting frames 41, one of which is formed on the bottom side 223 adjacent to the end portion 221 of the image sensor carriage 22 and the other ones of which are formed on the bottom side 223 adjacent to the end portion 222 of the image sensor carriage 22, as best shown in FIGS. 5 and 6. Each of the first rollers 42 is rotatable about a respective first axis (a1) parallel to the first direction (X), and is disposed to roll along a corresponding one of the top rail surfaces 311, 341, as best shown in FIG. 8.

The second rollers 50 are adapted to be mounted rotatably on the bottom side 223 adjacent to the end portion 222 of the image sensor carriage 22, as best shown in FIG. 5. Each of the second rollers 50 is rotatable about a second axis (a2) transverse to the first and second directions (X, Y), and is disposed in the first guiding groove 36 of the guiding groove unit 38 to roll along the first side rail surface 331, as best shown in FIG. 8. In this embodiment, each of the second rollers 50 has an axle portion 51 adapted to be connected to the bottom side 223 of the image sensor carriage 22 and formed with an annular groove 511, and a wheel portion 52 sleeved rotatably on the axle portion 51, as best shown in FIG. 9.

The spring-loaded retaining units 60 are adapted to be mounted on the bottom side 223 adjacent to the end portion 222 of the image sensor carriage 22. In this embodiment, the spring-loaded retaining units 60 are disposed in the second guiding groove 37 of the guiding groove unit 38 to contact rotatablely the second side rail surface 351.

Figure 9:
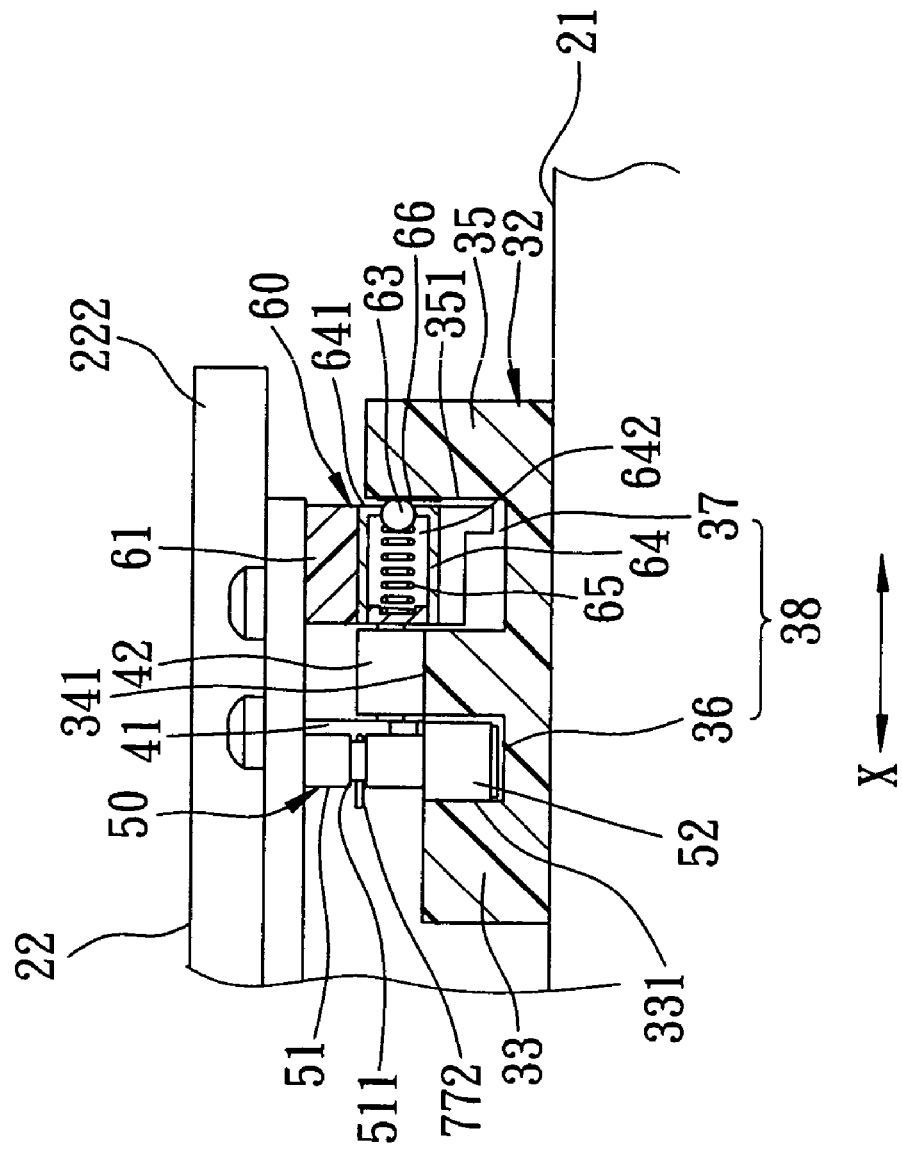
FIG. 9 is a fragmentary, partly sectional schematic view showing a guiding unit and the spring-loaded retaining unit of the first preferred embodiment.

As shown in FIGS. 8 and 9, each of the spring-loaded retaining units 60 includes a mounting block 64, a spring 65 and a rolling ball 63. The mounting block 64 is adapted to be mounted on the bottom side 223 via a mounting frame 61, and has a surface 641 that faces the second side rail surface 351 and that is formed with a spring-receiving groove 642 extending in the first direction (X). The spring 65, which is a compression spring in this embodiment, is received in the spring-receiving groove 642. The rolling ball 63 is mounted rotatably in and extends outwardly of the spring-receiving groove 642, and is biased by the spring 65 toward the second side rail surface 351 such that the rolling ball 63 contacts rotatably the wear-resistant strip 66, thereby resulting in a reduced friction force between the rolling ball 63 and the guiding seat 32.

Figure 7:
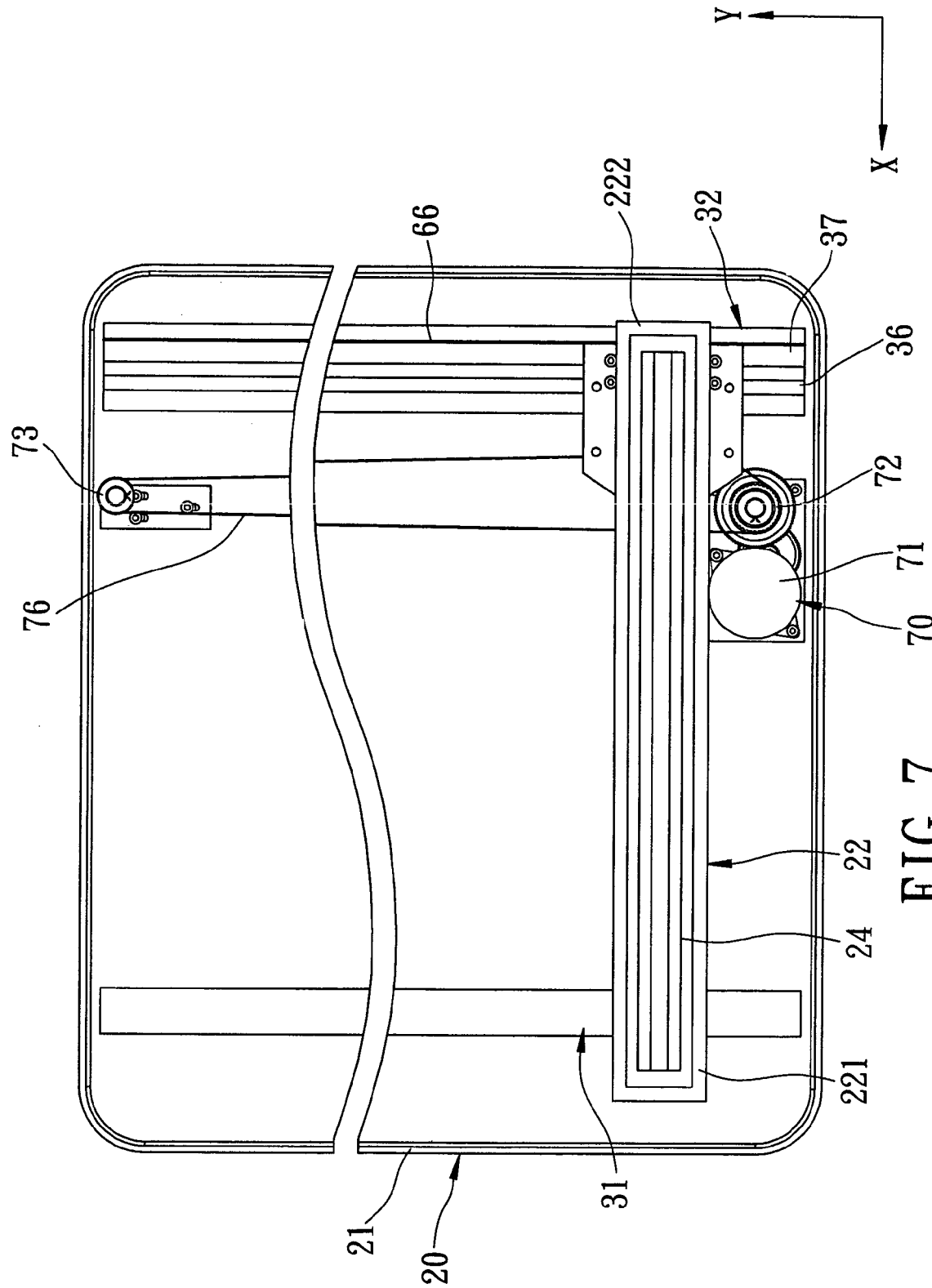
FIG. 7 is a fragmentary, schematic top view of FIG. 4.

The driving unit 70 is adapted for driving the image sensor carriage 22 to move in the second direction (Y) in the base 21. In this embodiment, the driving unit 70 includes a bi-directional motor unit 71, a transmission wheel set and a transmission belt 76, as shown in FIGS. 5 and 7. The bi-directional motor unit 71 is adapted to be mounted in the base 21. The transmission wheel set includes a driven wheel 72 and a follower wheel 73 spaced apart from the driven wheel 72 in the second direction (Y), is adapted to be mounted in the base 21, and is responsive to operation of the bi-directional motor unit 71. The transmission belt 76 is trained on the wheels 72, 73, and has opposite ends 761, 762 that are adapted to be connected to the image sensor carriage 22. The transmission belt 76, which can be a timing belt or a steel cable, is driven by the transmission wheel unit in response to the operation of the bi-directional motor unit 71 so as to enable the image sensor carriage 22 to move in the second direction (Y) in the base 21.

In this embodiment, the driving unit 70 further includes a pair of guide posts 74 adapted to be mounted on the bottom side 223 of the image sensor carriage 22 and disposed proximate to the second rollers 50 respectively for guiding the opposite ends 761, 762 of the transmission belt 76, respectively, and two springs 77 that connect the guided opposite ends 761, 762 of the transmission belt 76 to the axle portions 51 of the second rollers 50. More specifically, each of the springs 77 has opposite first and second hook ends 772, 771. The first hook ends 772 of the springs 77 are retained at the annular grooves 511 in the axle portions 51 of the second rollers 50, respectively, while the second hook ends 771 of the springs 77 are connected to the opposite ends 761, 762 of the transmission belt 76, respectively, as shown in FIGS. 5 and 8. As such, the tension of the transmission belt 76 can be evenly adjusted as a result of the springs 77.

It is noted that the guiding unit 30 can be modified in actual design as long as there is at least one top rail surface 311, 341 for at least one first roller 42, the first side rail surface 331 for at least one second roller 50, and the second side rail surface 351 for at least one spring-loaded retaining unit 60.

Figure 10:
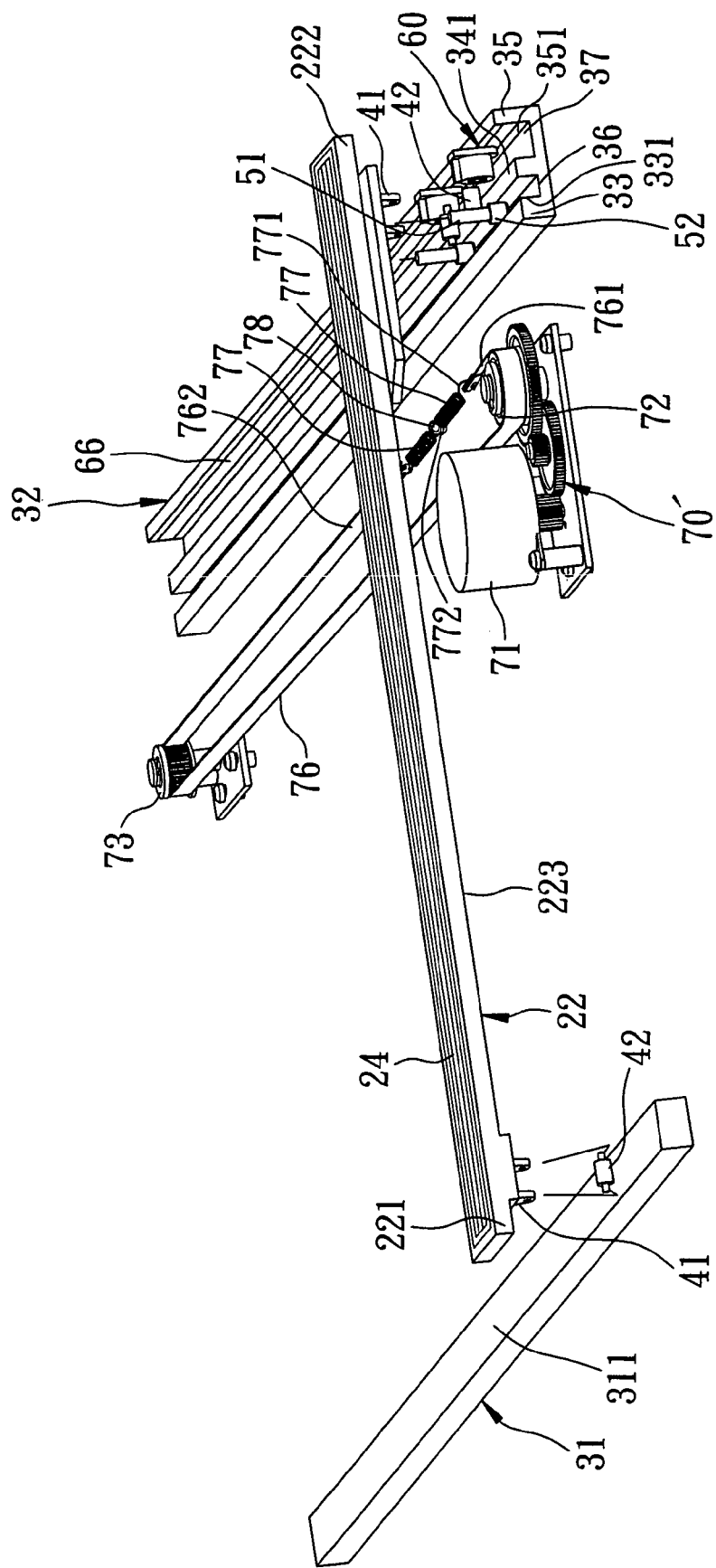
FIG. 10 is a partly exploded perspective view showing the second preferred embodiment of a driving device according to the present invention.
Figure 11:
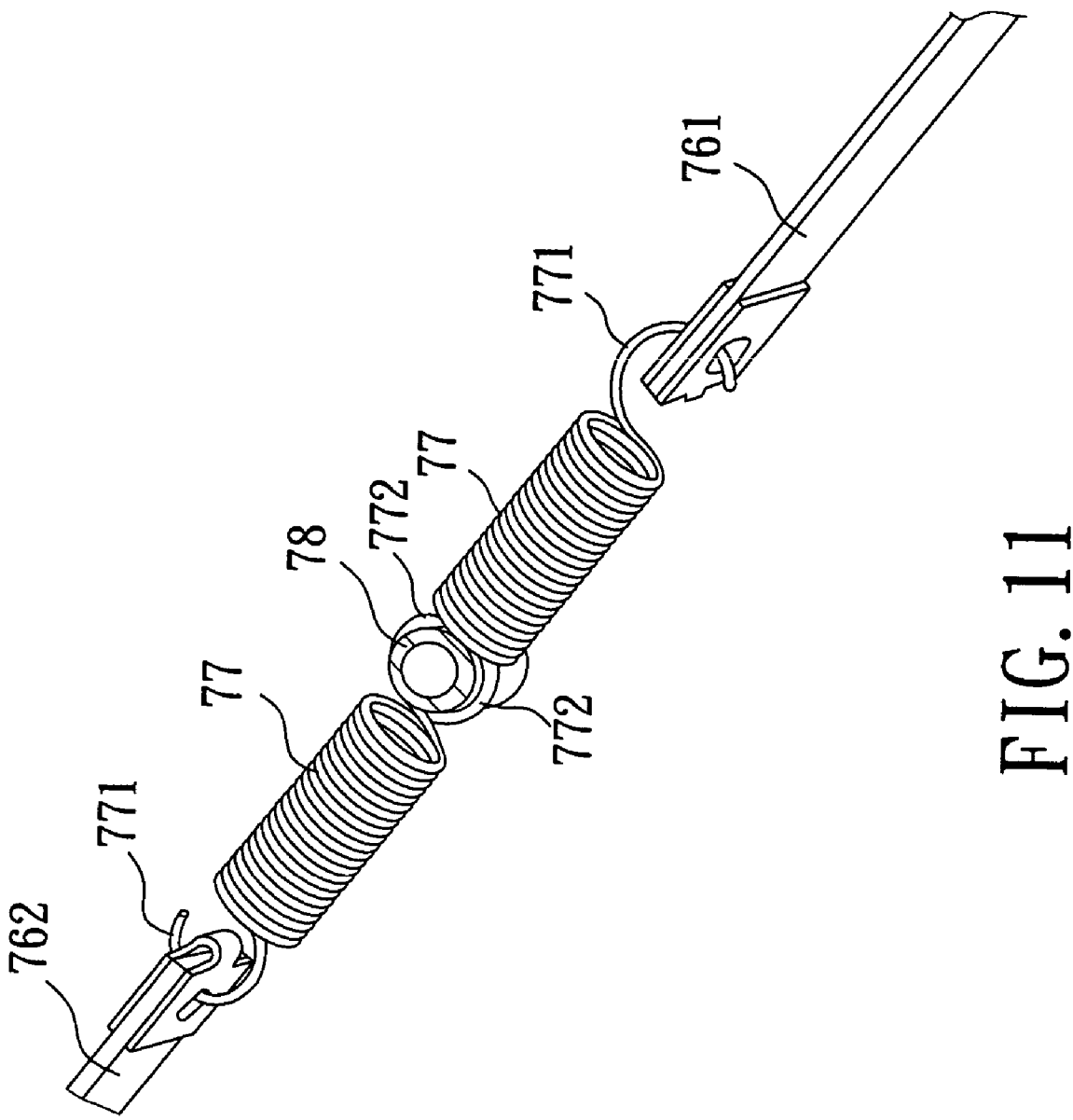
FIG. 11 is a fragmentary perspective view illustrating how a transmission belt is connected to a coupling post via two springs in the second preferred embodiment.

FIGS. 10 and 11 illustrate the second preferred embodiment of a driving device for a scanner according to this invention, which is a modification of the first preferred embodiment. Unlike the previous embodiment, the driving unit 70' further includes a coupling post 78 instead of the guide posts 74 in the first preferred embodiment. The coupling post 78 is adapted to be mounted on the bottom side 223 of the image sensor carriage 22. The first hook ends 772 of the springs 77 are connected to the coupling post 78, while the second hook ends 771 of the springs 77 are connected to the opposite ends 761, 762 of the transmission belt 76, respectively, as best shown in FIG. 11.

To sum up, due to the presence of the roller unit and the spring-loaded retaining units 60, the driving device of this invention can achieve stable driving movement of the image sensor carriage 22 without wobbling to ensure the scanning quality.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A scanner comprising:
   a base;
   an elongate image sensor carriage extending in a first direction;
   a cover; and
   a driving device including
      an elongate guiding unit mounted in said base, disposed under said image sensor carriage, and extending along a second direction transverse to the first direction, said guiding unit having at least one top rail surface, and first and second side rail surfaces transverse to said top rail surface,
      a roller unit mounted rotatably on a bottom side of said image sensor carriage, said roller unit including at least one first roller rotatable about a first axis parallel to the first direction and disposed to roll along said top rail surface, and at least one second roller rotatable about a second axis transverse to the first and second directions and disposed to roll along said first side rail surface,
      a spring-loaded retaining unit mounted on said bottom side of said image sensor carriage, and disposed to contact rotatablely said second side rail surface, and
      a driving unit for driving said image sensor carriage to move in the second direction in the base.

2. The scanner as claimed in claim 1, wherein said spring-loaded retaining unit includes:
   a mounting block mounted on said bottom side of said image sensor carriage and having a surface that faces said second side rail surface and that is formed with a spring-receiving groove extending in the first direction;
   a spring received in said spring-receiving groove; and
   a rolling ball mounted rotatably in and extending outwardly of said spring-receiving groove and biased by said spring toward said second side rail surface.

3. The scanner as claimed in claim 2, wherein said spring is a compression spring.

4. The scanner as claimed in claim 2, wherein said second side rail surface has a wear-resistant strip attached thereto for contacting said rolling ball.

5. The scanner as claimed in claim 1, wherein said guiding unit includes:
   an elongate guiding seat formed with a guiding groove unit that extends in the second direction and that configures said guiding seat with said first and second side rail surfaces; and
   an elongate rail rod formed with said top rail surface;
   said elongate guiding seat and said elongate rail rod parallel to and spaced apart from each other.

6. The scanner as claimed in claim 5, wherein said guiding groove unit includes:
   a first guiding groove having a groove-confining wall that includes said first side rail surface; and
   a second guiding groove having a groove-confining wall that includes said second side rail surface;
   said top rail surface that is disposed between said first and second guiding grooves;
   said second roller and said spring-loaded retaining unit being disposed in said first and second guiding grooves, respectively.

7. The scanner as claimed in claim 1, wherein said driving unit includes:
   a bi-directional motor unit mounted in said base;
   a transmission wheel set mounted in said base and responsive to operation of said bi-directional motor unit; and
   a transmission belt trained on said transmission wheel set and having opposite ends that are connected to said image sensor carriage, said transmission belt being driven by said transmission wheel set in response to the operation of said bi-directional motor unit so as to enable said image sensor carriage to move in the second direction in said base.

8. The scanner as claimed in claim 7, wherein said roller unit includes a pair of said second rollers, each of which has an axle portion connected to said bottom side of said image sensor carriage, and a wheel portion sleeved rotatably on said axle portion.

9. The scanner as claimed in claim 8, wherein said driving unit further includes a pair of guide posts mounted on said bottom side of said image sensor carriage and disposed proximate to said second rollers respectively for guiding said opposite ends of said transmission belt, respectively, and two springs that connect said guided opposite ends of said transmission belt to said axle portions of said second rollers, respectively.

10. The scanner as claimed in claim 7, wherein said driving unit further includes a coupling post mounted on said bottom side of said image sensor carriage, and two springs, each of which has a first end connected to said coupling post, and a second end opposite to said first end and connected to a respective one of said opposite ends of said transmission belt.

11. A driving device for a scanner that includes a base and an elongate image sensor carriage extending in a first direction in the base, said driving device comprising:
   an elongate guiding unit adapted to be mounted in the base, adapted to be disposed under the image sensor carriage, and extending along a second direction transverse to the first direction, said guiding unit having at least one top rail surface, and first and second side rail surfaces transverse to said top rail surface;
   a roller unit adapted to be mounted rotatably on a bottom side of the image sensor carriage, said roller unit including at least one first roller rotatable about a first axis parallel to the first direction and disposed to roll along said top rail surface, and at least one second roller rotatable about a second axis transverse to the first and second directions and disposed to roll along said first side rail surface;
   a spring-loaded retaining unit adapted to be mounted on the bottom side of the image sensor carriage, and disposed to contact rotatablely said second side rail surface; and
   a driving unit adapted for driving the image sensor carriage to move in the second direction in the base.

12. The driving device as claimed in claim 11, wherein said spring-loaded retaining unit includes:
   a mounting block adapted to be mounted on the bottom side of the image sensor carriage and having a surface that faces said second side rail surface and that is formed with a spring-receiving groove extending in the first direction;
   a spring received in said spring-receiving groove; and
   a rolling ball mounted rotatably in and extending outwardly of said spring-receiving groove and biased by said spring toward said second side rail surface.

13. The driving device as claimed in claim 12, wherein said spring is a compression spring.

14. The driving device as claimed in claim 12, wherein said second side rail surface has a wear-resistant strip attached thereto for contacting said rolling ball.

15. The driving device as claimed in claim 11, wherein said guiding unit includes:
   an elongate guiding seat formed with a guiding groove unit that extends in the second direction and that configures said guiding seat with said first and second side rail surfaces; and
   an elongate rail rod formed with said top rail surface;
   said elongate guiding seat and said elongate rail rod parallel to and spaced apart from each other.

16. The driving device as claimed in claim 15, wherein said guiding groove unit includes:
   a first guiding groove having a groove-confining wall that includes said first side rail surface; and
   a second guiding groove having a groove-confining wall that includes said second side rail surface, and
   said top rail surface that is disposed between said first and second guiding grooves;
   said second roller and said spring-loaded retaining unit being disposed in said first and second guiding grooves, respectively.

17. The driving device as claimed in claim 11, wherein said driving unit includes:
   a bi-directional motor unit adapted to be mounted in the base;
   a transmission wheel set adapted to be mounted in the base and responsive to operation of said bi-directional motor unit; and
   a transmission belt trained on said transmission wheel set and having opposite ends that are adapted to be connected to the image sensor carriage.

18. The driving device as claimed in claim 17, wherein said roller unit includes a pair of said second rollers, each of which has an axle portion adapted to be connected to the bottom side of the image sensor carriage, and a wheel portion sleeved rotatably on said axle portion.

19. The driving device as claimed in claim 18, wherein said driving unit further includes a pair of guide posts adapted to be mounted on the bottom side of the image sensor carriage and disposed proximate to said second rollers respectively for guiding said opposite ends of said transmission belt, respectively, and two springs that connect said guided opposite ends of said transmission belt to said axle portions of said second rollers, respectively.

20. The driving device as claimed in claim 17, wherein said driving unit further includes a coupling post mounted on said bottom side of said image sensor carriage, and two springs, each of which has a first end adapted to be connected to said coupling post, and a second end opposite to said first end and connected to a respective one of said opposite ends of said transmission belt.

* * * * *